(12) United States Patent
Imasato et al.

(10) Patent No.: US 11,854,719 B2
(45) Date of Patent: Dec. 26, 2023

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Fumitoshi Imasato, Yokkaichi (JP); Yusuke Maejima, Yokkaichi (JP); Yasuyuki Otsuka, Yokkaichi (JP); Toyoki Furukawa, Yokkaichi (JP); Kyoma Sahashi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/770,789

(22) PCT Filed: Oct. 22, 2020

(86) PCT No.: PCT/JP2020/039686
§ 371 (c)(1),
(2) Date: Apr. 21, 2022

(87) PCT Pub. No.: WO2021/095477
PCT Pub. Date: May 20, 2021

(65) Prior Publication Data
US 2022/0375645 A1  Nov. 24, 2022

(30) Foreign Application Priority Data
Nov. 12, 2019 (JP) .................................. 2019-204757
Apr. 3, 2020 (JP) .................................. 2020-067802

(51) Int. Cl.
*H01B 7/00* (2006.01)
*H01B 7/08* (2006.01)

(52) U.S. Cl.
CPC .......... *H01B 7/0045* (2013.01); *H01B 7/0823* (2013.01); *H01B 7/0846* (2013.01)

(58) Field of Classification Search
CPC .. H01B 7/0045; H01B 7/0823; H01B 7/0846; H01B 7/04; H01B 5/08; B60R 16/0207; B60R 16/0215
See application file for complete search history.

(56) References Cited

U.S. PATENT DOCUMENTS

2008/0190661 A1* 8/2008 O'Brien .............. B60R 16/0215
174/72 A
2015/0034381 A1* 2/2015 Harwath .............. H01B 7/0823
174/115

(Continued)

FOREIGN PATENT DOCUMENTS

JP 2017-224565 A 12/2017
JP 2019-185981 A 10/2019

(Continued)

OTHER PUBLICATIONS

Dec. 28, 2020 International Search Report issued in International Patent Application No. PCT/JP2020/039686.

*Primary Examiner* — Paresh Paghadal
(74) *Attorney, Agent, or Firm* — Oliff PLC

(57) ABSTRACT

A wire harness has less differences of the amount of deflection caused by the self weight when the wire harness is constructed by arranging the plurality of the electric wire having the different cross-sectional area of the conductor. A wire harness has first and second electric wires arranged side by side in a direction intersecting an axial direction of the electric wires. Each of the first and second electric wires includes a conductor with a plurality of elemental wires, the (Continued)

second electric wire has a larger conductor cross-sectional area than the first electric wire has, the second electric wire has the larger outer diameter of the elemental wires composing the conductor than the first electric wire has, and the second electric wire contains a same or smaller number of elemental wires composing the conductor in comparison with the first electric wire.

8 Claims, 4 Drawing Sheets

(56) References Cited

U.S. PATENT DOCUMENTS

| | | |
|---|---|---|
| 2019/0248308 A1* | 8/2019 | Hayakawa .............. H01B 7/041 |
| 2019/0259511 A1 | 8/2019 | Ooi et al. |
| 2020/0335240 A1 | 10/2020 | Ooi et al. |
| 2021/0057126 A1 | 2/2021 | Kim et al. |
| 2021/0193348 A1 | 6/2021 | Ooi et al. |
| 2021/0233677 A1* | 7/2021 | Jordan .............. G01R 19/16571 |
| 2022/0208418 A1* | 6/2022 | Hong ..................... H01B 9/003 |

FOREIGN PATENT DOCUMENTS

| | | |
|---|---|---|
| WO | 2018/088419 A1 | 5/2018 |
| WO | 2019/093309 A1 | 5/2019 |
| WO | 2019/093310 A1 | 5/2019 |

* cited by examiner

[1A]

[1B]

[2A]

[2B]

[4A]

[4B]

WIRE HARNESS

TECHNICAL FIELD

The present invention relates to a wire harness.

BACKGROUND ART

When an electric wire is routed in an automobile, etc., the electric wire is sometimes disposed as a form of a wire harness which composes a plurality of the electric wires and is fixed to the common sheet material. For instance, the patent literature 1 discloses a wire harness consisting of flat cables composing a flat twisted conductor having a substantially rectangular shape in cross section and an insulated covering which covers the flat twisted conductor. The wire harness is formed by aligning the flat cables at least part of the longitudinal direction in the long side direction of the cross-section.

CITATION LIST

Patent Literature

Patent Literature 1: JP 2017-224565 A
Patent Literature 2: WO 2019/093309 A1
Patent Literature 3: WO 2019/093310 A1

SUMMARY OF INVENTION

Problems to be Solved by the Invention

When a plurality of the electric wires are arranged side by side and compose the wire harness, if the amount of deflection of wire when its self-weight is applied is different for each wire, only a part of the wires arranged side by side may bend and drop in routing the wire harness, handleability of the wire harness may decrease. There is a possibility that the handleability of the wire harness will be reduced. Especially, when the wire harness includes the electric wires having different conductor cross-sectional areas, differences of the amount of deflection caused by self-weight are likely to occur between the electric wires. This is because the electric wire having a large conductor cross-sectional area has the large mass per unit length so that a large self weight is applied, and when the same elemental wires are contained in the conductor, the amount of deflection D2 the electric wire 2″ having a larger conductor cross-sectional area is larger than the amount of deflection D1 of the electric wire 2′ having smaller one, as shown in FIG. 3.

Thus, an object of the invention is to provide the wire harness in which the difference in the amount of deflection caused by self weight is reduced between the electric wires, when a plurality of electric wires having different conductor cross-sectional areas are arranged side by side to compose a wire harness.

Means of Solving the Problems

The present disclosure relates to a wire harness having first and second electric wires arranged side by side in a direction intersecting an axial direction of the electric wires. Each of the first and second electric wires contains a conductor comprising a plurality of elemental wires, the second electric wire has a larger conductor cross-sectional area than the first electric wire, the second electric wire has the larger outer diameter of the elemental wires composing the conductor than the first electric wire, and the second electric wire contains a same or smaller number of elemental wires composing the conductor in comparison with the first electric wire.

Advantageous Effects of the Invention

The wire harness according to the present disclosure can contribute to reduce the amount of deflection of each of the electric wires caused by self weight when a plurality of the electric wires are arranged side by side and composes the wire harness.

BRIEF DESCRIPTION OF DRAWINGS

In FIG. 1A, each conductor is separately covered with the insulator covering, and FIG. 1B illustrates that all the conductors are covered with the insulator covering collectively.

FIG. 2A is a perspective view and FIG. 2B is a cross-sectional view.

DESCRIPTION OF EMBODIMENTS

Figure 1:
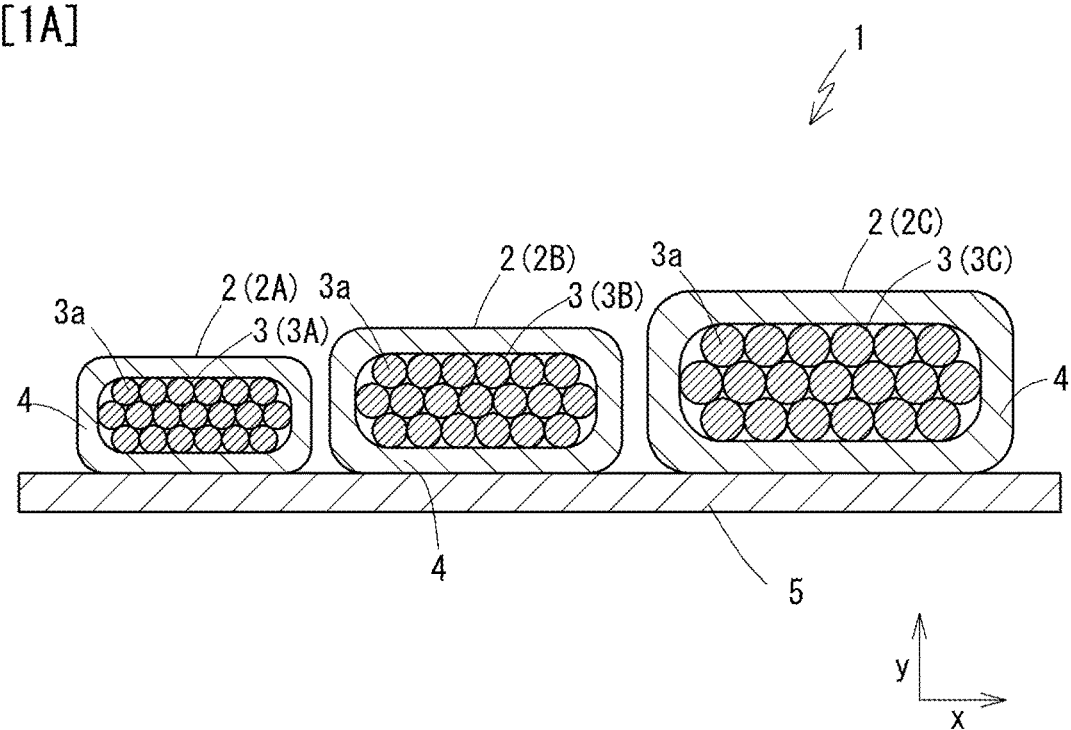
FIG. 1A is a cross-sectional view of a wire harness according to one embodiment of the present disclosure.
FIG. 1B is a cross-sectional view of the wire harness according to another embodiment.
Figure 1:
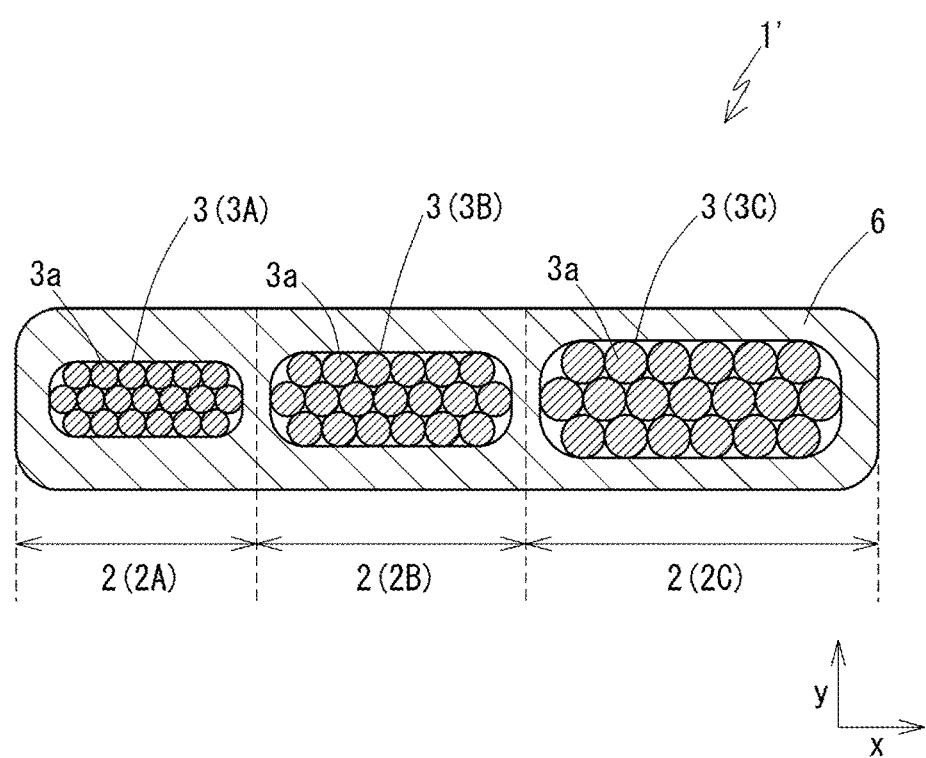
Figure 2:
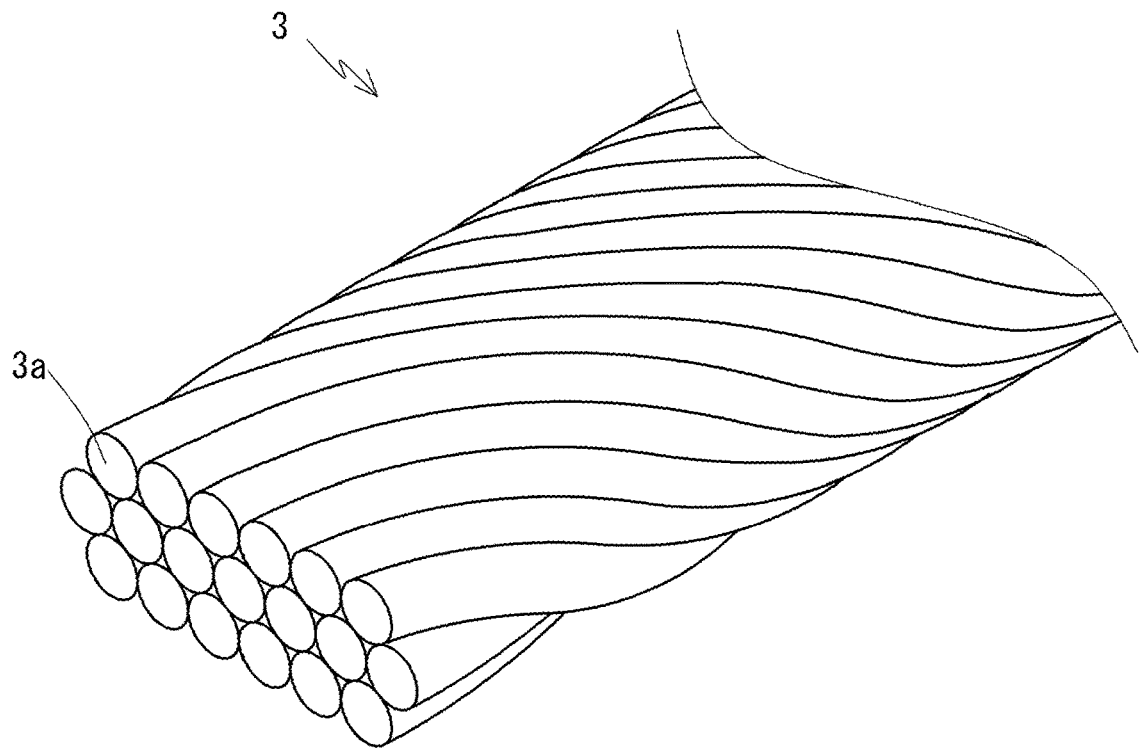
FIGS. 2A and 2B illustrates the conductor of the electric wire contained in the wire harness the wire harness shown in FIGS. 1A and 1B.
Figure 2:
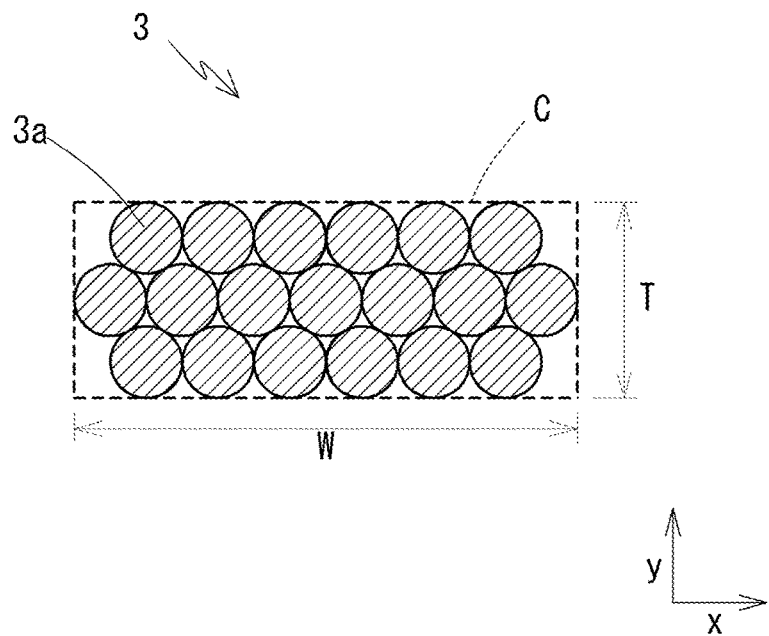

Description of Embodiments of the Present Disclosure

Hereinafter, detailed description of embodiments of the present disclosure will be provided.

A wire harness according to the present embodiment contains first and second electric wires arranged side by side in a direction intersecting an axial direction of the electric wires. Each of the first and second electric wires contains a conductor comprising a plurality of elemental wires, the second electric wire has a larger conductor cross-sectional area than the first electric wire, the second electric wire has the larger outer diameter of the elemental wires composing the conductor than the first electric wire, and the second electric wire contains a same or smaller number of elemental wires composing the conductor in comparison with the first electric wire.

In the electric wire, as the conductor cross-sectional area becomes larger, the mass per unit length becomes larger and the electric wire is subjected to a greater self weight. Thus, when using the elemental wires having the same size in outer diameter and varying the conductor-cross sectional area, the amount of deflection owing to self weight of the electric wire becomes larger as the conductor cross-sectional area becomes larger. However, in the wire harness described above, the second electric wire having a larger conductor cross-sectional area than the first electric wire has a larger outer diameter of the elemental wire composing the conductor. When the elemental wire having large diameter is used to compose the conductor, the deflection of the electric wire hardly occurs even where the same self weight is applied to the wire. Thus, although the second wire is subjected to greater self weight than the first wire, the amount of deflection caused by self weight will be reduced. As a result, in the second electric wire, the amount of deflection caused by self weight can be suppressed not to be significantly larger than the first electric wire. Therefore, in the wire harness, when the difference of the amount of deflection owing to its self weight can be suppressed small in the electric wires arranged side by side each other, handleability of the wire harness can be improved in routing the wire harness.

The second electric wire preferably has a same number of the elemental wires composing the conductor as the first electric wire. Thus, in the first and second electric wires, the difference in the amount of deflection caused by its self weight can be further kept easily small. Making the number of the elemental wires composing the conductor uniform is a simple index for ensuring that the amount of deflection between the electric wires would be the same degree of amount.

It is preferable that the wire harness contains three or more electric wires arranged side by side in the direction intersecting the axial direction of the electric wires, each of the three or more electric wires contains the conductor composing the plurality of the elemental wires, and the number of the elemental wires composing the conductor is a same in all three or more electric wires. Thus, in the electric wires composing the wire harness, the amount of deflection can be easily ensured to same degree. As a result, in routing the electric wires, handleability of the wire harness can be especially improved.

It is preferable that the conductors of the first and second electric wires contains a flat portion with the cross section of the conductor intersecting the axial direction of the electric wire having a flat shape and the first and second electric wires are arranged along the width direction of the flat shape. When the wire harness is formed by arranging the electric wires having the flat portions in the conductor along the width direction, length in height direction of the entire wire harness can be kept small and can be suitably used to be routed in a space of a limited height. If a plurality of the electric wires having the flat portions are arranged along the width direction, the length in width direction of the whole wire harness would be large. Furthermore, if the difference in the amount of deflection between the electric wires is large, the handleability of the wire harness tends to be complicated. However, in the first and second electric wires having different conductor cross-sectional area, when the outer diameter and the number of the elemental wires composing the conductor are defined as described above, the difference of the amount of deflection can be kept small and both space-saving property and handleability of the wire harness can be achieved.

In this case, in the cross section of the flat shape, defining the length in the width direction of the flat shape as W and the length in the height direction intersecting the width direction as T, the second electric wire preferably has a same flatness ratio W/T as the first electric wire. Thus, in the first and second electric wires, the difference in the amount of deflection can be especially kept small.

Alternatively, in the cross section of the flat shape, defining the length in the width direction of the flat shape as W and the length in the height direction intersecting the width direction as T, the second electric wire preferably has higher flatness ratio W/T than the first electric wire. In the second electric wire having the larger conductor cross-sectional area, when the flat ratio W/T is larger and the cross-sectional shape of the electric wire is laterally-longer, the first and second electric wires can keep differences in height direction small while keeping the difference in the amount of deflection small.

The flat portions of the first and second electric wires have flatness ratios W/T of 2 or higher and 5 or lower, where the length in the width direction of the flat shape is defined as W and the length in the height direction intersecting the width direction as T. Thus, in the wire harness, in the height direction, the high space-saving property can be obtained. At the same time, it can be easier to prevent excessively large width of the wire harness and excessive application of loads to the electric wire due to flattening of the conductors.

The first and second electric wires are preferably fixed to a commonly supporting member. Thus, the presence of the supporting member can improve the handleability of the wire harness. Especially, when the supporting member employed for adding rigidity to the wire harness, the handleability of the wire harness will be especially improved due to the effect of making the difference in the amount of deflection caused by self weight smaller between the first and second wires, and the effect of adding rigidity to the wire through the supporting member.

In this case, the supporting member is preferably a sheet material. Thus, when the first and second electric wires are aligned on one side of the sheet material and are fixed to the sheet material, the supporting member can be provided to the wire harness conveniently. The rigidity of the sheet material can be easily adjusted, and thus, the sheet material can easily function as a rigidity-imparting member.

In this case, the first and second electric wires are preferably fixed to the sheet material by fusion. As a result, the first and second wires can be fixed to the sheet material conveniently and rigidly.

Alternatively, the supporting member is a common covering material which is made of a continuous insulating material and covers the conductors of the first and second electric wires with insulating the conductors from each other. Thus, each of the first and second electric wires does not need to separately install the insulator covering, and further, the insulator covering can also serve as the supporting member. As a result, the wire harness having the supporting member can be formed with a simple structure and a reduced space. The wire harness having features described above can be manufactured by arranging the plurality of the conductors and extruding insulating material.

Detailed Description of Embodiments of the Present Disclosure

Hereinafter, detailed description of a wire harness according to one embodiment of the present disclosure will be provided with reference to FIGS. 1 to 4. In the present description, concerning the shapes of parts of the wire harness, concepts for describing 10 relationships among lines and surfaces such as parallel and vertical may include a deviation with reference to the concepts in geometry such as a deviation at an angle of approximately plus or minus 15 degrees, or an R shape where each corner is rounded. In addition, the concept of "same" with respect to the length of each part and the value of the conductor cross-sectional area among the diameter of the elemental wires as well as the ratios between those values, and the concept of "similar"

with respect to the shape of the cross section of the conductor may include a deviation approximately plus or minus 15%.

(Outline of the Wire Harness)

FIG. 1A illustrates the cross-sectional structure of a wire harness according to one embodiment of the present disclosure. The wire harness 1 has a plurality of the electric wires 2, in other words, at least two or more electric wires 2 (2A-2C). Detailed description of each of the electric wire 2 will be provided hereinafter, however, each electric wire 2 has a conductor 3 (3A-3C) including a plurality of the elemental wires 3a and an insulator covering 4 which covers outer periphery of the conductor 3.

In the wire harness 1, the plurality of the electric wires 2 are aligned mutually at the lateral direction (direction x), which is one of the directions intersecting the axial direction. In the embodiment illustrated in FIG. 1A, when each electric wire 2 has a flat portion where the cross-section intersecting the axial direction of the electric wire 2 has a flat shape, the plurality of the electric wires 2 are preferably arranged along the width direction (direction x) of the flatting shape. Further, in the in the embodiment illustrated in FIG. 1A, the electric wires 2 are arranged in only one row along the width direction (direction x). However, the electric wires 2 aligned side by side in the lateral direction may be stacked in multiple layers in the height direction (direction y). The plurality of the electric wires 2 arranged side by side in the lateral direction may be separated from each other or may be in contact with each other at the outer surface of the insulator covering. However, when the electric wire 2 aligned side by side in the lateral direction is in contact with each other, those electric wires 2 are not fixed to each other by any means other than the fixing structure a sheet material 5 which will be described later and are able to deflect and deform due to their own weight.

It is preferable that the electric wires 2 composing the wire harness 1 are fixed commonly at least partially to a supporting member along the axial direction as illustrated in the FIG. 1A. As the supporting member described above, the wire harness 1 according to the present embodiment is provided with the sheet material 5. When the cross-section intersecting the axial direction of each electric wire 2 is a flat shape, each electric wire 2 is preferably fixed on the surface along the width direction (direction x) of the flat shape. The material and the thickness of the sheet material 5 may not be limited. For instance, from the viewpoint of improving the handleability of the wire harness 1, the rigidity-imparting member with a higher rigidity than the electric wire 2 can be used as the sheet material 5 or as the materials composing part of the sheet material 5. The way of fixing of the electric wire 2 to the sheet material 5 is not particularly limited, and the suitable examples may include adhesion, fusion, or, restriction. However, from the viewpoint of the convenience of fixing and fixing strength, the fixing is preferably performed with fusion. For instance, a layer of thermoplastic resin may be disposed at least on one of the surface of the sheet material 5 and the surface of the insulator covering 4 of the electric wire 2 and the fusion can be performed by heating with the sheet material 5 being in contact with the electric wire 2.

The supporting member is not limited to the sheet material 5 described above, as long as it is a continuous body capable of fixing the plurality of the electric wires 2 collectively. For instance, as in the wire harness 1' according to another embodiment shown in FIG. 1B, an example of the supporting member can include the form having the common covering material 6. In this form, the electric wires 3 (3A-3C) aligned side by side in lateral direction with space kept from each other are covered by the common covering material 6. The common covering material 6 is made of a continuous insulating material, the common covering material 6 is placed to cover the assembly of the conductors 3, and further placed in the areas between the respective conductors 3, thereby insulate the wires to the outside and also therebetween. Each conductor 3 have uniform length in a center part of the height direction (direction y), and each upper and lower surface of the common insulator covering 6 is constructed as the flat surface.

In this form, the collective insulator covering 6 plays a role of the supporting member which support each conductor 3 in addition to its role as insulator covering. In the wire harness 1' according to another embodiment, there is no need to dispose the insulator covering 4 which covers each conductor 3 separately or the independent supporting member such as the sheet material 5. Thus, the entire configuration of the wire harness 1' can be simplified and the manufacturing costs can be reduced. Furthermore, since there is no need to cover each conductor 3 with the insulator covering 4 separately, the distance between the adjacent conductors 3 can be reduced comparing with the case where each insulator covering 4 covers the conductor 3 separately. The common covering material 6 can be formed by extruding the insulating material made of resin, with the conductors 3 arranged at predetermined distances. The wire harness 1' of another embodiment is entirely constructed as a single unit, and does not clearly have the plurality of the electric wires 2. However, each electric wire 3 (3A to 3C) and part of the common covering material 6 including the outer periphery of the electric wire 3 will be regarded as each electric wire 2 (2A to 2C) conveniently.

(Configuration of the Electric Wire)

Here, description of the configuration of the electric wire 2 composing the wire harness 1 (or 1'; the same shall apply hereinafter) will provided below. The configuration of the electric wire 2 is not particularly limited as long as it contains the conductor 3 containing the plurality of the elemental wires 3a. However, the conductor 3 is preferably constructed as a twisted conductor containing the plurality of the elemental wires 3a twisted together. The cross-sectional shape of the conductor 3 may not be particular limited, and any of the conductor such as a conventional conductor having a substantially circular cross-section may be used. However, it is more preferable to use the conductor 3 having the flat portion where cross-section intersecting an axial direction has the flat shape. The following description will be made for the electric wire 2 containing the flat portion will be provided as the examples.

FIG. 2A and FIG. 2B illustrates an external appearance of the conductor 3 comprising the electric wire 2 in the perspective and cross-sectional view intersecting the axial line of the electric wire 2, respectively. The conductor 3 is configured as a wire strand containing the plurality of elemental wires 3a twisted together. The conductor 3 has a flat external appearance at least in part along the axial direction. In other words, the conductor 3 has a flat portion where a cross section perpendicularly intersecting the axial direction of the conductor 3 has a flat portion. In the illustrated embodiment, the entire conductor 3 along the axial direction is formed as the flat portion described above. Here, the concept that "the cross section of the conductor 3 is flat" describes a state where a width W, which is a length of the longest line among lines that pass through the cross-section in parallel to edges constituting the cross-section and encompass the entire cross-section, is larger than a height T, which is a length of a line perpendicular to the above-mentioned longest line and encompass the entire cross-section.

While the cross-sectional shape of the conductor 3 may have any specific shape as long as it is flat, the cross section of the conductor 3 in the illustrated embodiment has the rectangular shape. In other words, in the cross-section, circumscribed edges C that circumscribe the elemental wires 3a constituting the cross section of the conductor 3 has opposing edges that are parallel to each other along the directions of width W (width direction x) and height T (height direction y) of the flat shape. The cross-sectional shape may be other than the rectangular shape, for instance, the examples of the circumscribed edge C may include an oval shape, an elliptical shape (a shape of a rectangular with half circles attached to both ends), a trapezoidal shape, and a parallelogram shape. FIGS. 2A and 2B show the cross section of each elemental wire 3a as the circular shape, however, in the electric wire 2, the cross-sectional shape of parts of the elemental wires 3a may deform from circular shape since the cross-sectional shape of the entire conductor 3 needs to be formed into a predetermined flat shape. The twisted wire conductor having a substantially circular cross-section, for instance, can be subjected to pressing with rollers to prepare the conductor 3 having the flat portion. When the pressing is performed under conditions where the elemental wire 3a undergoes work hardening, the strength of the conductor 3 can be increased with flattening the conductor 3.

The elemental wire 3a composing the conductor 3 may be composed of any conductible materials including metal materials. Examples of typical materials composing the elemental wire 3a may include copper, copper alloys, aluminum, and aluminum alloys.

The electric wire 2 is constructed by providing the insulator covering 4 on the periphery of the conductor 3 described above. In the electric wire 2, the entire shape including the insulator covering 4 reflects the shape of the conductor 3. If the conductor 3 has the flat cross-sectional shape, the entire shape of the electric wire 2 would have the flat cross-sectional shape. A material of the insulator covering 4 (or the common covering material 6; the same shall apply hereinafter) is not specifically limited, and a variety of polymer can be used to form the insulator covering 4. Further, the polymer material may contain fillers or additives as appropriate. In addition, as will be described later, the rigidity of the insulator covering 4 is preferably lower than that of the conductor 3 so that the deflection control of the conductor 3 by means of the limitation of the configuration of the conductor 3 can be sufficiently reflected as the entire deflection of the electric wire 2. Further, the mass per unit length the insulator covering 4 is preferably smaller than that of the conductor 3. In addition, FIGS. 1A and 1B illustrates that the insulator covering 4 and the common covering material 6 have the portion where they are not in close contact with the outer periphery of the conductor 3, however, in another embodiment, as shown in each of FIGS. 4A and 4B, the insulator covering 4 and the common covering material 6 may be close contact with the entire periphery of the conductor 3. Either the insulator covering 4 or the common covering material 6 can be formed in view of the conditions or other factors in extrusion.

In the electric wire 2, the conductor having the flat cross section enables a space to be required for routing to be kept smaller than in the case of the electric wire 2 having the substantially circular cross section with the same conductor cross-sectional area. In other words, spaces around an electric wire 2 in which other electric wires or other members are not allowed to be disposed can be reduced. In particular, a space occupied by the electric wire 2 in the height direction (direction y) can be made smaller. Thus, the electric wire 2 achieves the space-saving property easily. The effect of the space-saving property described above can be also obtained where the plurality of the electric wires 2 each having the flat portion are arranged along the width direction (direction x) to constitute the wire harness 1 as shown in FIGS. 1A and 1B. For instance, the wire harness 1 can be routed in the space of a limited height such as a small space between two plate-shaped members.

The flatness ratio (W/T) of the flat shape in cross section of each conductor 3 constituting the wire harness 1 is not particularly limited; however, examples of the ratio (W/T) may include two or higher and eight or lower. When the flatness ratio is two or higher, the effect of saving space property in the height direction can be increased. On the other hand, when the flatness ratio is eight or lower, it prevents excessive loads from being applied to the conductor 3 due to the flattening of the conductor 3. It is also easier to limit the space occupied by the wire harness 1 in the width direction in a way not to become excessively large. The flatness ratio is particularly preferable five or lower.

(Configuration of Each Conductor Composing the Wire Harness)

Hereunder, the description will be made for the conductors 3 contained in the electric wires 2 constituting the wire harness 1 in terms of the relation between the configurations of the conductors 3.

The first and second wires, which are two of the plurality of electric wires 2 composing the wire harness 1, have the following relationship to each other in the configuration of the conductor 3. Here, the wires indicated by the reference numerals 2A and 2B in the FIGS. 1A and 1B, are described as the first and second electric wires respectively.

The second electric wire 2B has the larger cross-sectional area than the first electric wire 2A. In addition, the second electric wire 2B has the larger the outer diameter of each elemental wire 3a composing the conductor 3 (3A, 3B) than the first electric wire 2A. Furthermore, the second electric wire 2B has a same or smaller number of elemental wires 3a composing the conductor 3 in comparison with the first electric wire 2A.

Figure 3:
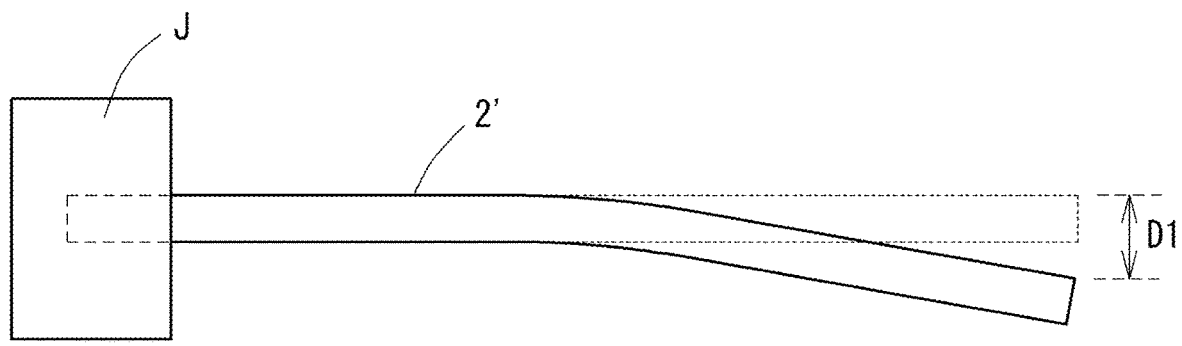
FIG. 3 illustrates the difference in the amount of deflection due to self weight between the electric wire having a smaller conductor cross-section (up) and the electric wire having a larger one (bottom). Dotted line illustrates the electric wire without deflection.
Figure 3:
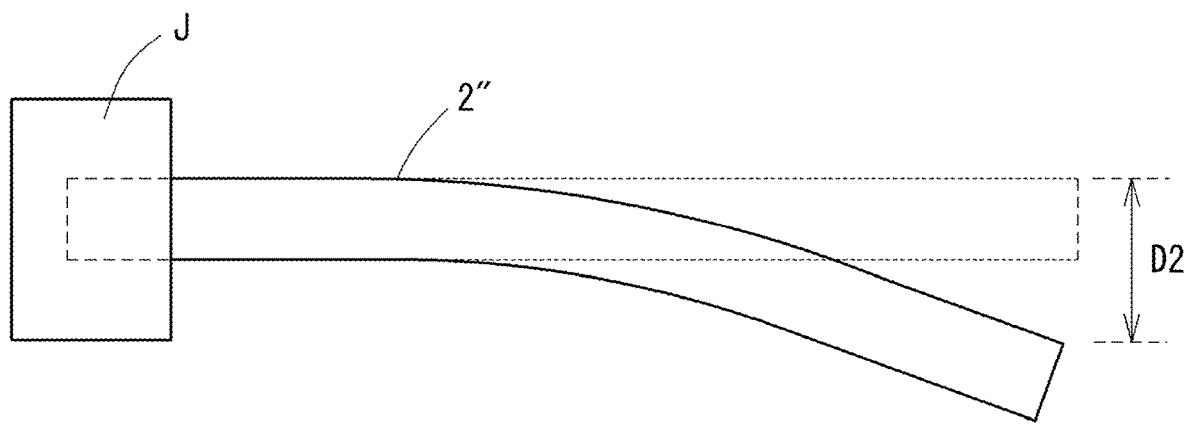
Figure 4:
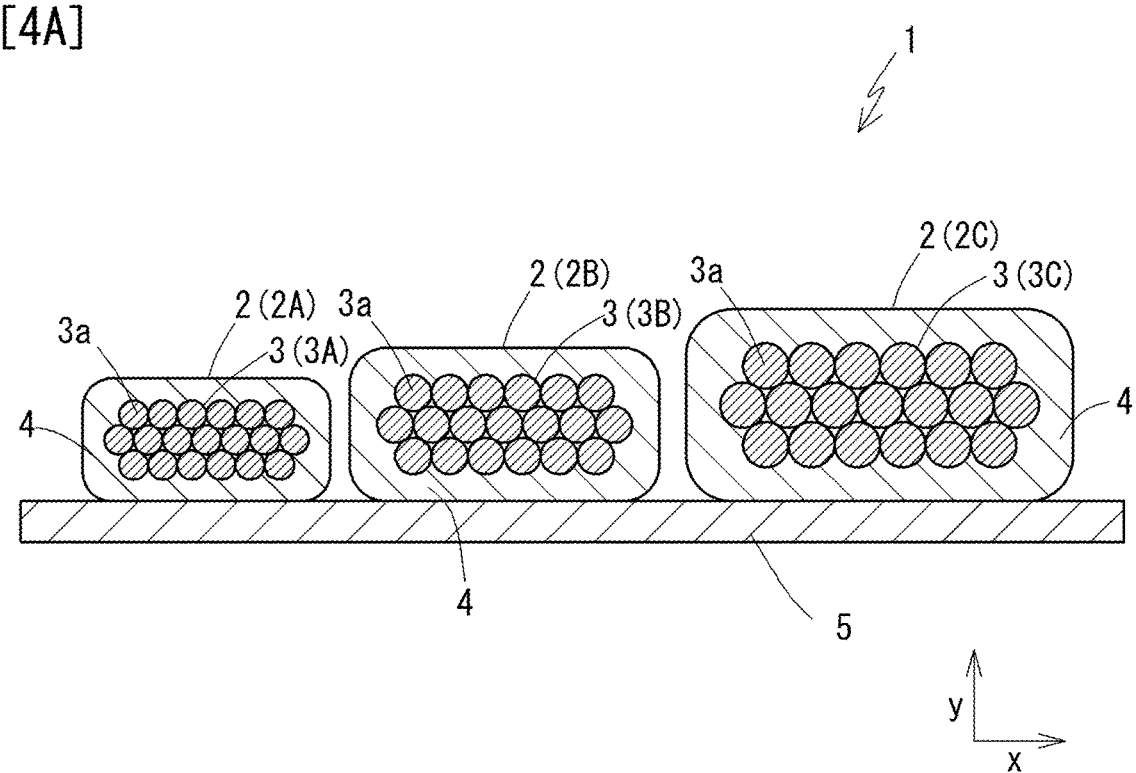
FIG. 4A is a cross-sectional view of the wire harness shown in FIG. 1A and of another embodiment having a different insulator covering.
FIG. 4B is a cross-sectional view of the wire harness shown in FIG. 1B and of the variant having a different collective insulator covering.
Figure 4:
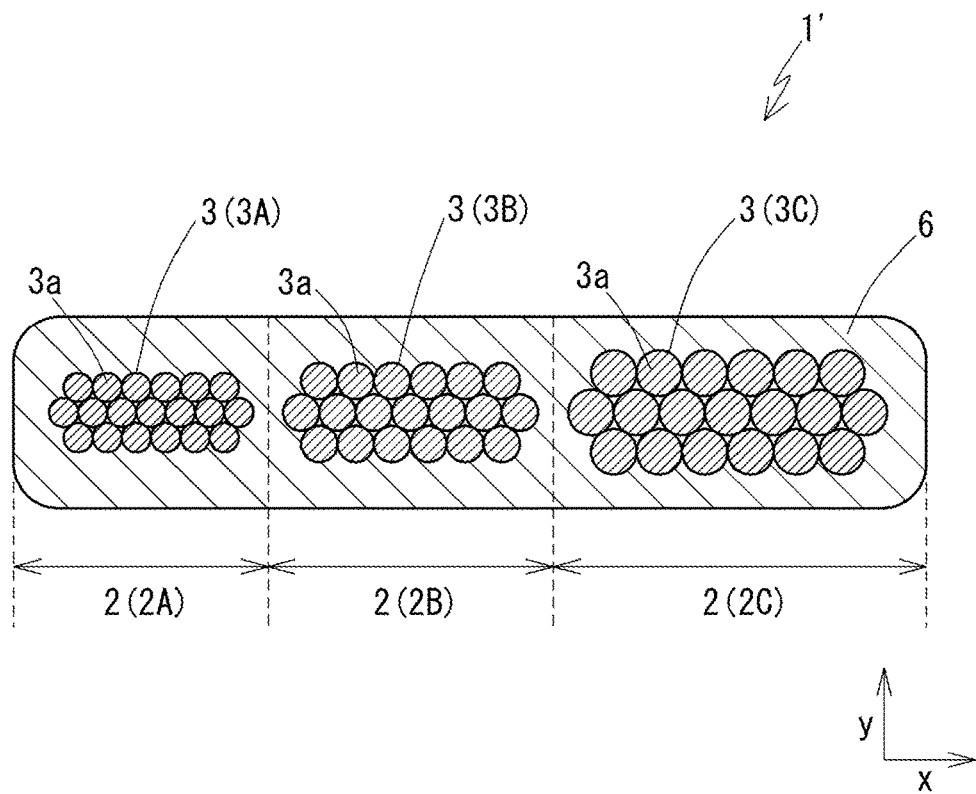

As shown in FIG. 3, if one end of the electric wires 2, 2' is fixed with the fixing jig J but the other end is not fixed and left free, the electric wires 2, 2' would deflect due to self weight. The amount of hanging due to this deflection is the amount of deflection D1 and D2 due to self weight. The larger the conductor cross-sectional area, the larger the mass of the electric wire per unit length. Therefore, the own weight to be applied to the wire 2', 2" will be larger for the wire having a larger cross-sectional area in the case where the wires 2 are cut out to have the same length. Conventionally, in order to change the conductor cross sectional area of the electric wire, as long as the change in the conductor cross-sectional area is not extremely large, the number of the electric wires 3a constituting the conductor are generally increased or decreased instead of changing the outer diameter of the elemental wires 3a. Thus, when the conductor cross-sectional area is changed by employing the elemental wires 3a having same outer diameter, in the electric wires 2', 2" cut to same length, the amount of deflection D2 of the electric wire 2' which has larger conductor cross-sectional area and is subjected to larger self weight is larger than the amount of deflection D1 of the electric wire 2" which has smaller conductor cross-sectional area and is subjected to smaller self weight as shown in FIG. 3.

As shown in FIG. 3, when the wire harness 1 is constructed by arranging the plurality of electric wires 2', 2" having different deflection amounts D1 and D2 due to their self weight in the width direction, in the entire of the wire harness, the portion where the electric wire 2" having the larger conductor cross-sectional area is disposed have larger amount of deflection due to its self weight than another portion. Thus, the wire harness 1 tends to hang down at the position. Then, when the wire harness is routed, a special treatment such as support will be required only for the position where the electric wire 2"" is arranged to prevent its hang down, leading to decrease of the handleability of the wire harness. Therefore, the handleability of the wire harness may be decreased. When each electric wire 2', 2" composing the wire harness is fixed to the sheeting material constructed as the rigidity-imparting member, the rigidity added by the sheeting material limit the deflection due to self weight of the electric wires 2', 2". Thus, the differences in the amount of deflection D1, D2 between the electric wires 2', 2" becomes smaller, however, it is difficult to remove the difference completely.

However, the wire harness 1 according to the present embodiment is formed such that the conductor 3 of the second electric wire 2B having a larger conductor cross-sectional area and thus being subjected to a larger own weight is formed using elemental wires 3a whose outer diameters are larger than those of the elemental wires 3a of the electric wire 2A having a smaller conductor cross-sectional area, to thereby limit the deflection amount of the wire harness 1. The larger the outer diameter of the elemental wire 3a, the more rigid the elemental wire 3a is. Since the conductor 3 contains the elemental wires 3a, in the conductor 3 assembled the elemental wire 3a, each elemental wires 3a is less likely to deflect and the amount of deflection of the entire conductor 3 can be suppressed to small even if same self weight is applied to the conductor 3. As a result, the difference in the amount of deflection between the first electric wire 2A and the second electric wire 2B can be kept smaller compared to the case where the first electric wire 2A and the second electric wire 2B are composed of the elemental wire 3a having same outer diameter.

Thus, the two electric wires 2A and 2B of the wire harness 1 contain elemental wires 3 which are different from one another in outer diameter, so that the differences in deflection amounts of their own weight are reduced between the electric wires 2A and 2B. Thus, it will eliminate the situation where the wire harness 1 hangs down larger at a position where the second electric wire 2B is arranged than at a position where the first electric wire 2A is arranged. Accordingly, when the wire harness 1 is routed, the handleability of the wire harness 1 will be increased and working property will be improved. In particular, where the conductors 3 composing the electric wires 2A and 2B have the flat portion, the entire wire harness 1 is likely to occupy the large width length owing to the flat shape. In such case, if there is a large difference of the amount of deflection between the electric wires 2A and 2B, the wire harness 1 would easily become difficult to handle. However, when the difference of the amount of deflection between the electric wires 2A and 2B is kept small, the handleability of the wire harness 1 can be greatly improved and thus, the wire harness 1 can have both handleability and space-saving property. Furthermore, in the wire harness 1, when each electric wire 2A and 2B is fixed to the sheet material 5 constructed as the rigidity-imparting member, the wire harness 1 can have the particularly high handleability due to both effects of the rigidity provided by the sheet material 5 to each electric wire and the effect of reducing the difference of the amount of deflection owing to self weight between the electric wires 2A and 2B.

When the second electric wire 2B has the smaller number of elemental wires 3a composing the conductor 3 than the electric wire 2A, the difference of the amount of deflection owing to self weight between both electric wires 2A and 2B can become small, and especially, when the second electric wire 2B has the same number of the elemental wires 3a composing the conductor 3 to the first electric wire 2A, the difference of the amount of deflection owing to self weight can be especially kept small. As will be described in the following embodiment, when the first and second electric wires 2A and 2B have the same number of the elemental wires 3a composing the conductor 3, the amount of deflection of both electric wires 2A and 2B can be kept substantially equal. When the conductor cross sectional areas differentiated between the plurality of the electric wires 2A and 2B, making the number of the elemental wires 3a contained in the conductors 3 the same between the wires 2A and 2B is a simple index for ensuring that the difference of the amount of the deflection owing to own weight kept small between the electric wires 2A and 2B. By designing the conductor 3 according to this index, a possible problem may be prevented where the difference of the amount of deflection owing to self weight between the first and second electric wires 2A and 2B is not kept small since the outer diameter of the elemental wires 3a composing the electric wire 2B is not sufficiently large, or where the second electric wire 2B has the smaller amount of deflection owing to self weight than the first electric wire 2A since the outer diameter of the elemental wires 3a composing the second electric wire 2B is too large.

Furthermore, when the first and second electric wires have the flat portion, in the cross section intersecting to the axial direction, defining the length in the width direction of the flat shape as W and the length in the height direction intersecting the width direction as T, the second electric wire preferably has the same flatness ratio W/T as the first electric wire. The first and second electric wires 2A and 2B especially preferably have the similar cross-sectional shape (the shape of the circumscribed figure C). As a result, the amount of deflection of the first and second electric wires 2A and 2B can be easily kept substantially equal.

Meanwhile, it is preferable that the second electric wire 2B having larger conductor cross-sectional area have larger flatness ratio W/T than the first electric wire 2A. Since the second electric wire 2B has the larger conductor cross-sectional area than the first electric wire 2A, the height T of the cross section tends to be increased. However, by setting the flatness ratio W/T set larger to have a laterally-longer (wide-longer) cross-sectional shape, the height T can be suppressed. Thus, the effect of reducing the difference of the amount of deflection owing to self weight between the first and second electric wires 2A and 2B will be less than the case where the flatness ratio W/T is same, however, the difference of height T between the first and second electric wires 2A and 2B can be suppressed. As a result, when the sheet material 5 is used as the supporting member, the unevenness of the upper surface (the opposite surface to the one fixed to the sheeting material 5) of the wire harness 1 becomes smaller. Then, the space-saving property of the wire harness 1 can be further improved. Furthermore, since the interference with other components such as hitching may be reduced, and operation such as transportation may be easier by supporting the upper surface of the wire harness 1, the handleability of the wire harness 1 is improved by different effect from equalization of the amount of deflection. Furthermore, since the second electric wire 2B having the larger cross-sectional area and the larger mass per unit length contacts and is fixed to the sheet material 5 at the relatively larger area than the first electric wire 2A with respect to the volume occupied by the wires 2A and 2B, fixation to the sheet material 5 is strengthened, and the mass of the electric wire 2B may be securely supported on the surface of the sheet material 5. When the common covering material 6 is used as the supporting member, the common covering material 6 can be formed thinner as the whole and the space-saving property of the wire harness 1' can be improved, where the difference of height T between the first and second electric wires 2A and 2B is suppressed.

In the above-described embodiments, the description has been made for the relationship of the configurations of the conductors 3 of the first and second electric wires 2A and 2B by focusing only the first and second electric wires 2A and 2B among the plurality of the wires 2 contained in the wire harness 1, it is preferable that two pairs appropriately selected from three or more all electric wires 2 or preferably all of the two pairs appropriately selected from all electric wires 2 satisfy the same relationship between the first and second electric wires 2A and 2B described above when the wire harness 1 contains three or more electric wires 2. In other words, in three or more of all electric wires 2, preferably all electric wires 2, it is preferable that the larger the conductor cross-sectional area, the larger the outer diameter of the elemental wires 3a composing the conductor 3, and that the number of the elemental wires 3a composing the conductor 3 should be smaller or mutually same. In three or more, preferably all electric wires 2, the embodiment in which the number of elemental wires 3a composing the conductor 3 is a same as each other is particularly suitable. In addition, in the cross section of the flat portion, the flatness ratio W/T should be same each other regardless of the conductor cross-sectional area, and the cross-sectional shape of the flat portion should be similar. Alternatively, the larger the conductor cross-sectional area, the larger the flatness ratio W/T should be. In the embodiments shown in FIGS. 1A and 1B, the larger the conductor cross-sectional area of all three electric wires 2A, 2B, and 2C, the larger the outer diameter of the elemental wires 3a composing the conductor 3 (3A to 3C), and the number of elemental wires 3a is same. The flatness ratio W/T is also same among all electric wires 2A, 2B, and 2C.

In the above description, it is mainly assumed that the material of the elemental wires 3a composing each conductor or among the plurality of the conductors 3 is same, and as described above, the material is preferably same with each elemental wire 3a. However, even when the elemental wires 3a made of different materials are mixed and used, the above-described configurations of the conductor 3 can be applied as long as the rigidity (elastic modulus) of the material itself does not differ greatly, to effectively suppress the difference of the amount of deflection between the electric wires 2.

EXAMPLE

Hereinafter, examples according to an embodiment of the present invention are explained. It should be noted that the present invention is not limited by these examples. In this section, the amount of deflection owing to self weight was compared for the electric wires having different conductor cross-sectional area according to the number of the elemental wires composing the conductor.

[Test Methods]
(Preparation of the Samples)

The conductor was prepared by twisting aluminum alloy wires having predetermined conductor cross-sectional area. As shown in Table 1 below, the number of the elemental wires was set to 37 for samples 1-6 regardless of the conductor cross-sectional area, and the outer diameter of the elemental wire used was selected according to the predetermined conductor cross-sectional area. For samples 7 and 8, the number of the elemental wires was set to 16 and 19, respectively.

The obtained conductors of the twisted wire were subjected to pressing with rollers from four directions to prepare the flatten conductor having the rectangular cross section. The pressure applied with the rollers was adjusted to obtain the widths and heights shown in Table 1. The width and height of the conductor were selected so that a generally rectangular shape with a flatness ratio W/T=3.0 was obtained in the cross section, regardless of the conductor cross-sectional area.

Furthermore, the insulator covering was formed outer periphery of the obtained conductor by extruding polyethylene resin. The thickness of the insulator covering was determined in accordance with the conductor cross-sectional area. The entire dimensions of the electric wire, including the insulator covering, are shown in Table 1.

(Evaluation of Deflection)

The amount of deflection was measured for each obtained electric wire. For the evaluation, a part of each sample of the electric wire was cut out to have a length of 300 mm, and the part of the electric wire that extends 100 mm length from one end was fixed with the fixing jig J as shown in FIG. 3. Then, for the other end at the other end in which the electric wire was deflected by its self weight, the hanging length from the horizontal was measured, and the amount of deflection due to self weight was determined.

[Test Results]

Table 1 shows the results of the measurement of the amount of deflection due to self weight for each sample 1-8, along with the configuration of the conductor, the dimensions of the conductor and the entire electric wire (actual measurements).

TABLE 1

| Sample No. | Conductor Cross-sectional Area [mm$^2$] | Number of Elemental wire | Outer diameter of Elemental wire [mm] | Conductor dimensions ||| Electric wire dimensions || Amount of deflection due to self weight [mm] |
| --- | --- | --- | --- | --- | --- | --- | --- | --- | --- |
| | | | | Width W [mm] | Height T [mm] | Flatness ratio [W/T] | Width [mm] | Height [mm] | |
| 1 | 0.75 | 37 | 0.16 | 1.72 | 0.57 | 3.0 | 2.32 | 1.17 | 1.2 |
| 2 | 1 | | 0.18 | 1.93 | 0.64 | | 2.53 | 1.24 | 1.2 |
| 3 | 2 | | 0.26 | 2.79 | 0.93 | | 3.49 | 1.63 | 1.2 |

TABLE 1-continued

| Sample No. | Conductor Cross-sectional Area [mm²] | Number of Elemental wire | Outer diameter of Elemental wire [mm] | Conductor dimensions | | | Electric wire dimensions | | Amount of deflection |
|---|---|---|---|---|---|---|---|---|---|
| | | | | Width W [mm] | Height T [mm] | Flatness ratio [W/T] | Width [mm] | Height [mm] | due to self weight [mm] |
| 4 | 3 | | 0.32 | 3.44 | 1.15 | | 4.24 | 1.95 | 1.2 |
| 5 | 5 | | 0.42 | 4.51 | 1.50 | | 5.31 | 2.30 | 1.2 |
| 6 | 8 | | 0.51 | 5.48 | 1.83 | | 6.28 | 2.63 | 1.3 |
| 7 | 0.75 | 16 | 0.30 | 2.76 | 0.92 | 3.0 | 3.46 | 1.62 | 0.8 |
| 8 | 2 | 19 | 0.36 | 2.76 | 0.92 | 3.0 | 3.46 | 1.62 | 1.0 |

Table 1 shows that, for samples 1 to 6 containing same number of the elemental wire, the amount of deflection of the wire due to self weight is almost same regardless of the conductor cross-sectional area. The result indicates that when the conductor cross-sectional area is increased, the deflection of the electric wire due to self weight can be kept constant by increasing the outer diameter of the elemental wires used and not changing the number of elemental wires. In samples 7 and 8 where the number of the elemental wires is reduced, the conductor cross-sectional area is the same as in samples 1 and 3, respectively. However, the deflection of the electric wire due to self weight is smaller than that of samples 1 and 3, where the number of strands is set to 37. This result occurs since the number of the elemental wires was reduced and the outer diameter of the elemental wires was increased instead, the rigidity of the elemental wires was increased, and thus, the electric wires are less likely to deflect due to their self weight.

Although embodiments of the present invention have been described above in detail, the present invention is not limited to the particular embodiment(s) disclosed herein, and various changes and modifications may be made without deviating from the scope of the present invention. Moreover, even when the diameter and the flatness ratio of the electric wire not only satisfy the relationship described above, but appropriately selected, by arranging the plurality of the electric wires having the flat portion and adopting the form which the electric wire is covered by the common covering material, the wire harness can obtain the effect of simplified configuration and space-saving property.

LIST OF REFERENCE NUMERALS 1,1' Wire harness
2 (2A-2C) Electric wire
2A First electric wire
2B Second electric wire
2' Electric wire having small conductor cross-sectional area
2'''' Electric wire having large conductor cross-sectional area
3 (3A-3C) Conductor
3a Elemental wire
4 Insulator covering
5 Sheet material
6 Common covering material
C Circumscribed Figure
D1, D3 Amount of deflection
J Fixing jig
T Height of the conductor
W Width of the conductor
x Width direction (Lateral direction)
y Height direction (Longitudinal direction)

The invention claimed is:

1. A wire harness, comprising first and second electric wires arranged side by side in a direction intersecting an axial direction of the electric wires, wherein
   each of the first and second electric wires comprises a conductor comprising a plurality of elemental wires;
   the second electric wire comprises a larger conductor cross-sectional area than the first electric wire;
   the second electric wire comprises the larger outer diameter of the elemental wires composing the conductor than the first electric wire;
   the second electric wire comprises a same or smaller number of elemental wires composing the conductor in comparison with the first electric wire;
   the conductors of the first and second electric wires comprise a flat portion with the cross section of the conductor intersecting the axial direction of the electric wire having a flat shape and;
   the first and second electric wires are arranged along a width direction of the flat shape; and
   in the cross section of the flat shape, defining a length in the width direction of the flat shape as W and a length in a height direction intersecting the width direction as T, the second electric wire has a same flatness ratio W/T as the first electric wire.

2. The wire harness according to claim 1, wherein the second electric wire comprises a same number of elemental wires composing the conductor as the first electric wire.

3. The wire harness according to claim 1, wherein the wire harness comprises three or more electric wires arranged side by side in the direction intersecting the axial direction of the electric wires;
   each of the three or more electric wires comprises the conductor composing the plurality of the elemental wires; and
   the number of the elemental wires composing the conductor is the same in all three or more electric wires.

4. The wire harness according to claim 1, wherein the flatness ratios of the flat portion of the first and second electric are 2 or higher and 5 or lower.

5. The wire harness according to claim 1, wherein the first and second electric wires are fixed commonly to a supporting member.

6. The wire harness according to claim 5, wherein
   the supporting member is a sheet material, and
   each of the first and second electric wires includes an insulating covering which covers an outer periphery of the respective conductor.

7. The wire harness according to claim 6, wherein the first and second electric wires are fixed to the sheet material by fusion.

8. The wire harness according to claim 5, wherein the supporting member is a common covering material which is made of a continuous insulating material and covers the conductors of the first and second electric wires with insulating the conductors from each other.

\* \* \* \* \*